Jan. 2, 1951     O. SATHER, JR     2,536,572

TRACTOR AND IMPLEMENT SEAT

Filed Jan. 21, 1948     2 Sheets-Sheet 1

Ole Sather, Jr.
INVENTOR.

Jan. 2, 1951     O. SATHER, JR     2,536,572
TRACTOR AND IMPLEMENT SEAT
Filed Jan. 21, 1948     2 Sheets-Sheet 2
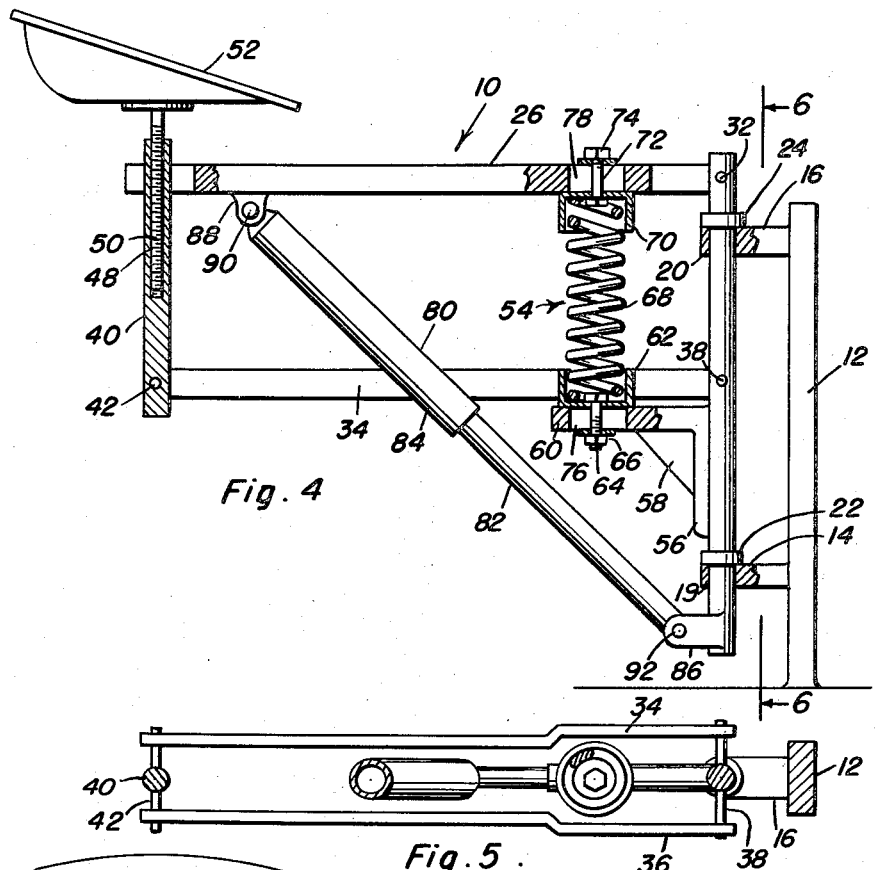
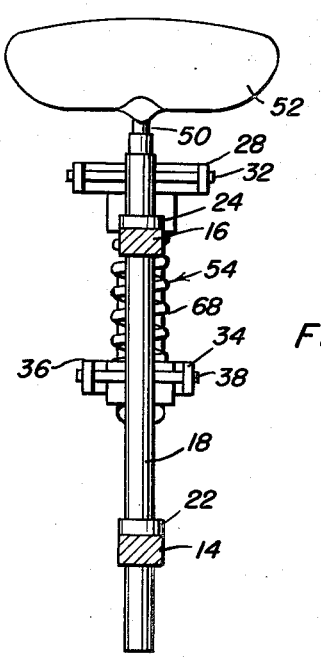
Ole Sather, Jr.
*INVENTOR.*

Patented Jan. 2, 1951

2,536,572

UNITED STATES PATENT OFFICE 2,536,572

TRACTOR AND IMPLEMENT SEAT

Ole Sather, Jr., Velva, N. Dak.

Application January 21, 1948, Serial No. 3,582

7 Claims. (Cl. 155—51)

This invention relates to a seat assembly for a vehicle and is particularly adapted for utilization and employment with agricultural implements, such as a tractor, harrow, planter or the like.

A principal object of this invention is to provide a seat assembly, that is so mounted and constructed so as to add materially to the comfort of the driver and to enable the driver to view the ground to the left or to the right, without leaving the seat.

Another object of this invention is to provide a seat assembly that will automatically adapt itself to the unevenness of the ground and will absorb the shock caused by the uneven ground or other obstacles, as the implement is driven or moved along the ground.

A meritorious feature of this invention resides in the provision of a seat assembly that is pivotally and swively mounted on the frame of an agricultural implement, such as a tractor or harrow.

Another object of this invention is the provision of a seat assembly, adapted for use with an agricultural implement, that is simple and inexpensive to manufacture and is convenient to install or mount on any agricultural implement, of conventional construction, and is durable and efficient in operation.

With these and ancillary objects and other meritorious features of this invention, which will become apparent as the following description proceeds in view, this invention is made and it consists of certain novel features and arrangement of parts, as illustrated in the accompanying drawings, wherein:

Figure 4 is a vertical sectional view taken substantially on the lines 4—4 of Figure 2;

Figure 5 is a cross-sectional view taken substantially on the lines 5—5 of Figure 1, and;

Figure 6 is a vertical sectional view taken substantially on the plane of the line 6—6 of Figure 4.

Figure 1:
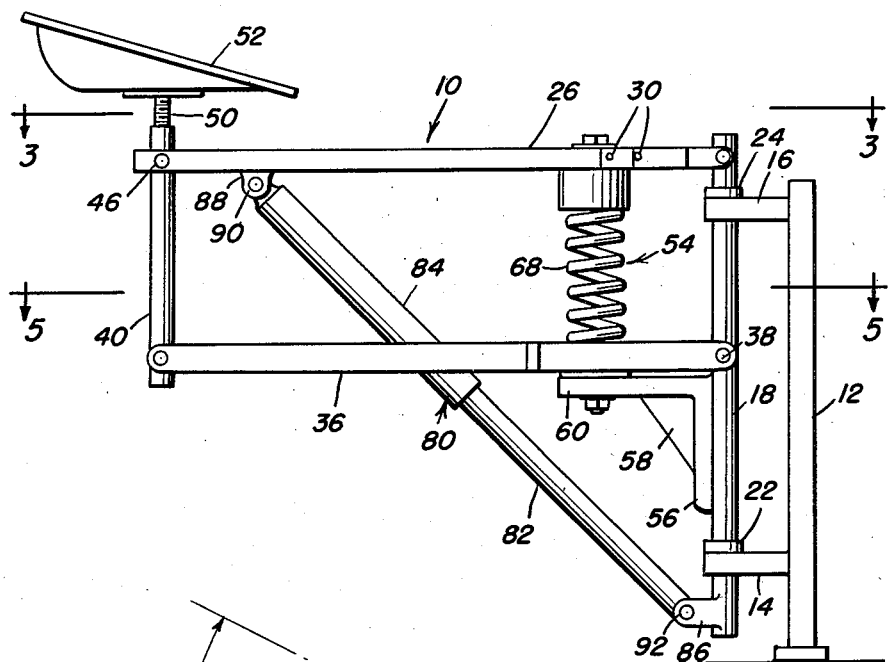
Figure 1 is a side elevational view of the seat assembly, shown mounted on a rear portion of an agricultural vehicle or implement.

Referring now particularly to the drawings, wherein a preferred embodiment of this invention is shown for illustrative purposes only, the seat assembly, generally denoted by the character reference 10, is shown mounted or secured to the rear portion or body section 12, of an agricultural implement, such as a tractor, harrow, planter or the like. Suitably secured to the rear portion 12 of the agricultural implement and extending or projecting laterally therefrom are a pair of vertically spaced opposing bracket arms 14 and 16. The terminating portions 18 and 19 of the bracket arms 14 and 16, respectively, are constructed and arranged in the form of sleeves to accommodate therein a support post 18, which is swively mounted therein. Suitable means are provided to limit the longitudinal movement of the support post 18 within the sleeves 18 and 19 and includes stop plates 22 and 24, which are formed integrally around the support post 18, at vertically spaced distance and are adapted to seat on the upper surface of the sleeves 18 and 19.

Pivotally secured to the support post 18 and extending laterally therefrom is a seat bar 26. A yoke 28, having apertured terminating portions, is secured to the seat bar by suitable means such as rivets 30 at one end and the apertured terminating portions are adapted to receive therethrough a pivot pin 32 which is journalled through the support post 18 and through the apertured terminating portions of the yoke 28 to pivotally support the seat bar 26 on the support post. Pivotally secured to the support post 18 in spaced vertical relationship to the seat bar 26 are a pair of laterally extending opposing brace bars 34 and 36. The opposing brace bars 34 and 36 are pivoted to the support post 18 and spaced therefrom by means of the pivot pin 38, which is inserted through the support post 18 and has its terminating sections journalled in the apertured opposing ends of the brace bars. Of course, suitable means are provided to secure the connection and may comprise cotter pins, keys or the like, which are inserted in the portions of the pivot pin 38 projecting beyond the brace bars 34 and 36. Pivotally supported at the opposite ends of the brace bars and seat bar is a seat post 40. Suitable means are provided to pivot the seat post 40 to the terminating portions of the respective bars and include a pivot pin 42 which is journalled through the seat post and has its terminating portions journalled in the apertured ends of the opposing brace bars 34 and 36, in a construction similar to the pivot arrangement provided for securing the brace bars to the support post 18. The seat bar 26 is pivoted to the seat by means of the yoke terminating section 44, which is placed around the side walls of the seat post 40 and has a pivot pin 46 journalled through the apertures formed in the yoke arms and through the seat post.

A vertically and centrally disposed threaded bore 48 is formed in the upper portion of the seat support 40 and is adapted to receive and support therein a seat rod 50, which is complementary to the threaded portion of the bore 48. Thus, it can be seen that the seat 52 seated on the seat rod 50 and supported thereby is vertically adjustable relative to the seat bar 26 by rotating the seat rod 50 within the threaded bore 48 of the seat post 40 to either raise or lower the seat 52 accordingly.

Suitable means are provided to absorb the shock caused by the movement of the agricultural implement over uneven ground or foreign obstacles, such as rocks or the like, and comprises a shock absorber, generally denoted by the reference character 54.

The shock absorber 54 comprises an angle bracket 56 having an angular supporting connecting web 58 to form the angular juncture. The angle bracket 56 is secured at one side to the support post 18, the other angular portion 60 providing a seat for the shock absorber 54. Adjustably seated on the support 60 is a cap-like member 62, oval in cross-section and having a circular flange formed thereon. Suitable means are provided to secure the cap 62 to the seat of angle bracket 60 and include a bolt 64 and an appurtenant nut 66. Seated within the cap member 62 is a coiled compression spring 68, having its other end secured or supported within a similar cap member 70 which is secured to the seat bar 26 by means of the bolt 72 and the nut 74.

Means are provided for longitudinally adjusting the spring relative to the weight of the occupant in the seat 52 and includes a slot 76 centrally disposed in the seat 60 and extending lengthwise therewith, within which the bolt 64 is inserted. A similar slot 78 in vertical alignment with the slot 76 is constructed and arranged in the seat bar 26.

It can thus be seen that by loosening the nuts 66 and 74 respectively, the entire assembly 54 may be moved a desired distance toward the seat 52 to provide a more proportionate resiliency and shock absorbing function, depending upon the weight of the occupant of the seat 52.

Means are provided to limit the downward movement of the seat assembly and includes extensible means 80. The extensible means 80 comprises telescopic concentric tubes 82 and 84, which are pivotally secured to the support post and the seat bar by means of the apertured ears 86 and 88 and the pivot pins 90 and 92 journalled through the apertured ears and through the tubular rods 82 and 84 respectively.

In operation, the seat assembly is swivelly and pivotally secured to the rear portion of an agricultural implement and the occupant sitting in the seat 52 would be comfortably supported therein by the shock absorber 64 which would absorb the bumps and jolts due to the uneven ground or other obstacles. The extensible means 80 connected with the support post and the seat bar is provided to limit the downward travel of the seat bar and the connected seat 52.

Figure 2:
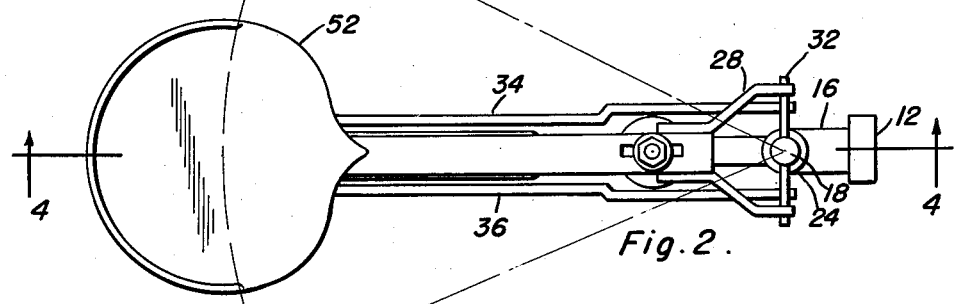
Figure 2 is a top plan view of the seating device, shown in Figure 1.
Figure 3:
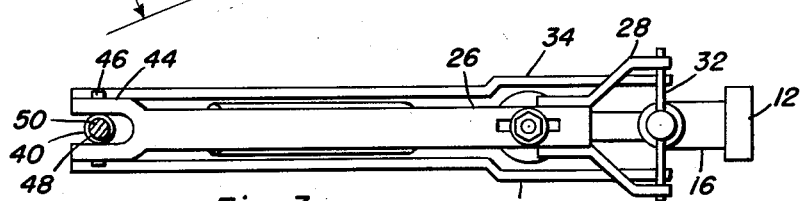
Figure 3 is a transverse cross-sectional view taken substantially on the plane of lines 3—3 of Figure 1.

Referring specifically to Figure 2 of the drawings, where the swivelling of the seat assembly in a horizontal swivel is shown in dotted lines, it can be seen that the seat assembly is normally in central longitudinal line with the agricultural implement, which is a normal driving position. However, at certain times during the operation of machines, such as a cultivator, and also in the hoeing or planting of row crops, it is imperative that the driver be able to see clearly to his left or right. An occupant sitting in the seat 52 by shifting his weight or pressing his foot against the side or otherwise, can swivel the seat assembly, through the medium of the support post 18 supported swivelly in the sleeves 18 and 20 of the bracket arms 14 and 16 to a position to the left or to the right of the central longitudinal line of the agricultural implement.

It is believed that the foregoing description when viewed in conjunction with the drawings, is sufficient to enable those skilled in the art to comprehend the objectives and structure of this device, and accordingly, a more detailed description is not believed necessary.

Since many modifications and changes in style and structure will readily occur to those skilled in the art, the modification illustrated in the drawings and defined in the specification is not proposed to be of a limiting nature, and certain changes in style, structure and arrangement of parts may be effected without a departure from the spirit of the invention and within the scope of the appended claims.

Having described the invention what is claimed as new is:

1. A seat assembly adapted for mounting on an agricultural vehicle comprising spaced brackets secured to a vehicle, a support post swivelly attached to the brackets, a seat bar having a yoked end pivotally secured to the support post, a seat post pivotally secured to the seat bar, a seat adjustably supported by the seat post, a pair of parallel brace bars pivoted to the support post and seat post, an angle bracket mounted on the support post, resilient supporting means seated on the angle bracket and disposed through the brace bars and connected to the seat bar, means for transversely adjusting the resilient means, extensible means for limiting the travel of the seat bar and brace bars.

2. A seat assembly comprising vertically spaced brackets secured to a vertical support, a support post swivelly attached to the brackets, a seat post, parallel vertically spaced supporting members pivotally connected between said support post and seat post, a seat adjustably supported by said seat post, a bracket mounted on the support post, a shock absorber assembly supported by said bracket and bearing upwardly against the upper supporting member, means for adjusting said shock absorber assembly relative to said seat post and means for limiting the arc of downward movement of the seat post.

3. A seat assembly comprising vertically spaced brackets secured to a vertical support, a support post swivelly attached to the brackets, a seat post, parallel vertically spaced supporting members pivotally connected between said posts, a seat adjustably supported by said seat post, resilient means supported by said support post and bearing upwardly against one of the supporting members, means for adjusting said resilient means relative to said seat post and extensible means for limiting the downward travel of the seat post.

4. A seat assembly comprising a vertically disposed swivelly mounted support post, a seat post, parallel vertically spaced supporting members pivotally connected between said posts, a seat adjustably supported by said seat post, a supporting plate projecting from said support post, shock absorbing means slidably anchored between said plate and the upper supporting member and means for limiting the arc of downward movement of the seat post with respect to the support post.

5. A seat assembly comprising a vertically disposed swivelly mounted support post, a vertically disposed seat post, parallel vertically spaced supporting members pivotally connected between said posts, a seat adjustably supported by said seat post, a supporting plate projecting from said support post, a coiled spring supported on said plate and contracted between said plate and the upper supporting member, means for adjusting said spring relative to the seat post and extensible means connected between the upper supporting member adjacent the seat post and the lower end of the support post.

6. A seat assembly comprising a vertically disposed swivelly mounted support post, a seat post, a seat adjustably supported by said seat post, parallel vertically spaced supporting members pivotally connected between said posts, a supporting plate projecting outwardly from said support post, a coiled spring supported on said plate and contracted between said plate and the upper supporting member, anchoring cups for the ends of the spring slidably carried by said plate and supporting member and locking means for said cups.

7. A seat assembly comprising a vertically disposed support post adapted to be swivelly mounted to a vertical support, a seat post, a seat adjustably supported by said post, parallel vertically spaced supporting members pivotally connected between said posts, a supporting plate projecting outwardly from said support post, a coiled spring slidably supported and contracted between said plate and the upper supporting member, means for locking the ends of the spring in adjusted positions relative to the seat post and extensible means connected between the lower end of the support post and the upper supporting member adjacent the seat post for defining the downward travel limit of the seat post.

OLE SATHER, Jr.

REFERENCES CITED

The following references are of record in the file of this patent:

UNITED STATES PATENTS

| Number | Name | Date |
|--------|------|------|
| 1,960,939 | Hansen | May 29, 1934 |
| 2,339,647 | Meyer | Jan. 18, 1944 |
| 2,452,280 | Zahller | Oct. 28, 1948 |

FOREIGN PATENTS

| Number | Country | Date |
|--------|---------|------|
| 669,881 | Germany | Jan. 5, 1939 |
| 731,473 | France | May 30, 1932 |